(12) United States Patent
Pradier et al.

(10) Patent No.: US 7,589,620 B2
(45) Date of Patent: Sep. 15, 2009

(54) AXLE END EQUIPMENT FOR A VEHICLE, IN PARTICULAR AN AIRCRAFT

(75) Inventors: Jean-Clair Pradier, Houilles (FR); Eric Evenor, Courdimanche (FR); Thomas Lavaud, Meudon (FR); Bertrand Maes, Vanves (FR)

(73) Assignee: Messier-Bugatti, Velizy Villacoublay (FR)

( * ) Notice: Subject to any disclaimer, the term of this patent is extended or adjusted under 35 U.S.C. 154(b) by 275 days.

(21) Appl. No.: 11/605,355

(22) Filed: Nov. 29, 2006

(65) Prior Publication Data
US 2008/0084331 A1 Apr. 10, 2008

(30) Foreign Application Priority Data
Nov. 29, 2005 (FR) .................................. 05 12070
Apr. 13, 2006 (FR) .................................. 06 03265

(51) Int. Cl.
*B60C 23/00* (2006.01)
(52) U.S. Cl. ..................... 340/448; 340/445; 73/146.5
(58) Field of Classification Search ................ 340/445, 340/447, 448; 73/146–146.5; 244/103
See application file for complete search history.

(56) References Cited

U.S. PATENT DOCUMENTS

| 5,190,247 | A | * | 3/1993 | Le Chatelier | 244/103 R |
| 6,902,136 | B2 | * | 6/2005 | Mackness | 244/100 R |
| 7,202,778 | B2 | * | 4/2007 | Buenz et al. | 340/448 |
| 2004/0173014 | A1 | * | 9/2004 | Pradier et al. | 73/146 |
| 2005/0046558 | A1 | | 3/2005 | Buenz et al. | |

FOREIGN PATENT DOCUMENTS

DE 38 01 277 A1 7/1989
FR 2 665 417 A 2/1992

* cited by examiner

*Primary Examiner*—Daniel Wu
*Assistant Examiner*—Hongmin Fan
(74) *Attorney, Agent, or Firm*—Sughrue Mion, PLLC

(57) ABSTRACT

The invention relates to axle end equipment for a vehicle, in particular an aircraft, the equipment comprising a stationary portion for securing to the axle and a rotary portion for securing to the wheel carried by the axle. According to the invention, the rotary portion comprises first remote connection means in communication with a sensor mounted on the wheel so as to put the sensor and the rotary portion of the equipment into contactless electromagnetic relationship.

5 Claims, 7 Drawing Sheets

FIG_5

FIG_6

AXLE END EQUIPMENT FOR A VEHICLE, IN PARTICULAR AN AIRCRAFT

The invention relates to axle end equipment for a vehicle, in particular an aircraft.

BACKGROUND OF THE INVENTION

Axle end equipments for vehicles, in particular aircraft, are known that comprise a stationary portion for being placed in the axle and a rotary portion for being secured to a wheel carried by the axle.

For example, such equipment may include a tachometer for measuring the speed of rotation of the wheel, and a pressure sensor for measuring the pressure that exists in a tire fitted to the wheel.

The pressure sensor is connected by a cable to the rotary portion. When the wheel is removed, the operator must disassemble the rotary portion and the pressure sensor, and as a result the pressure sensor and the connection between the rotary portion and the pressure sensor run the risk of being damaged.

OBJECT OF THE INVENTION

An object of the invention is to provide equipment that does not present the above-specified drawback.

BRIEF DESCRIPTION OF THE INVENTION

In order to achieve this object, the invention provides axle end equipment for a vehicle, in particular an aircraft, the equipment comprising a stationary portion for securing to the axle and a rotary portion for securing to the wheel carried by the axle, the equipment including first remote connection means for putting a sensor mounted on the wheel into contactless electro-magnetic relationship with the rotary portion of the equipment.

It is thus possible to remove the rotary portion without worrying about the sensor, which, since it has no mechanical or electrical connection with the rotary portion, can be left on the wheel without any risk of damage.

BRIEF DESCRIPTION OF THE DRAWINGS

The invention can be better understood in the light of the following description given with reference to the accompanying drawings, in which.

DETAILED DESCRIPTION OF THE INVENTION

Figure 1:
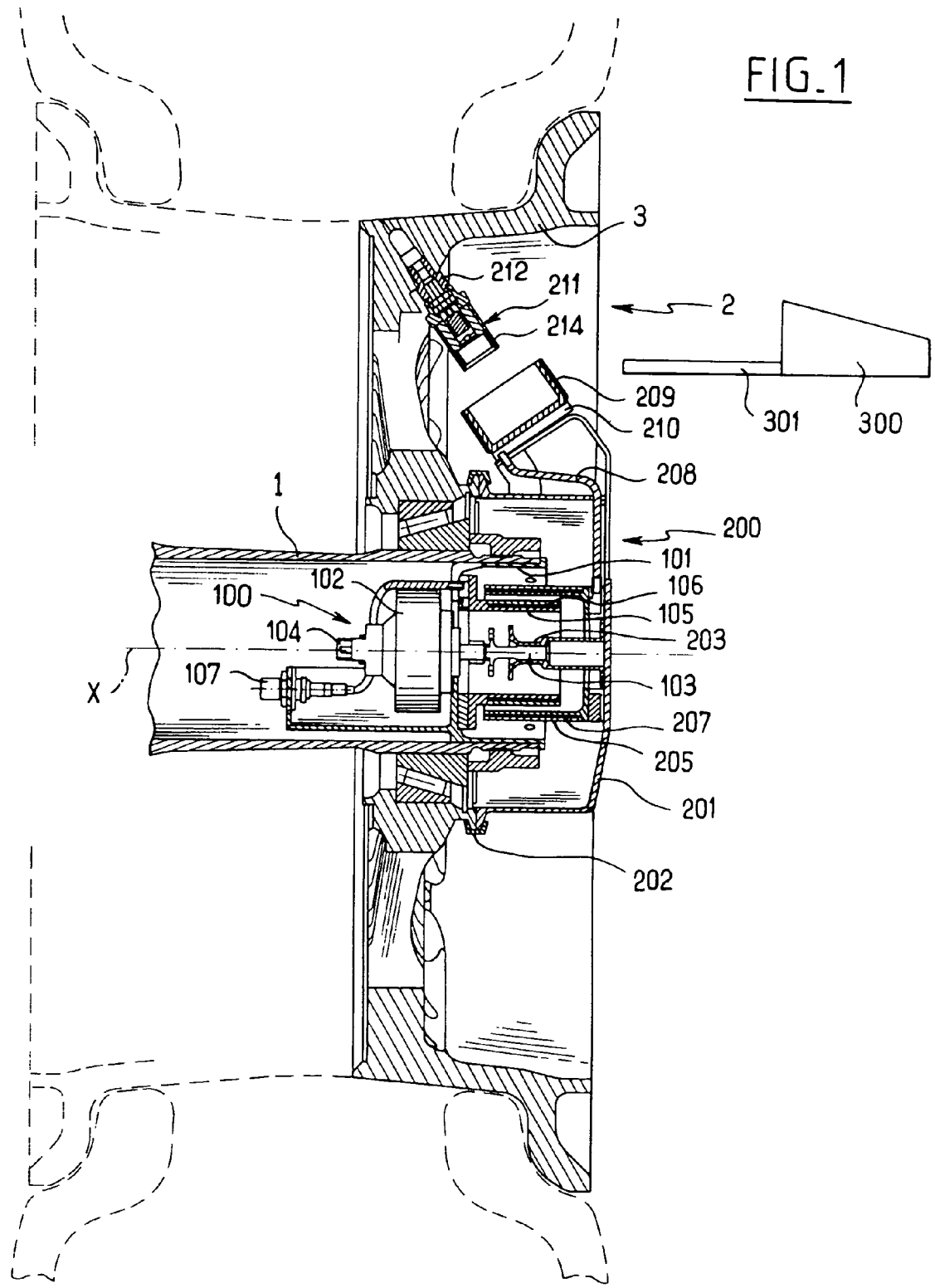
FIG. 1 is a section view of the end of an aircraft axle fitted with equipment constituting a first embodiment of the invention.
Figure 2:
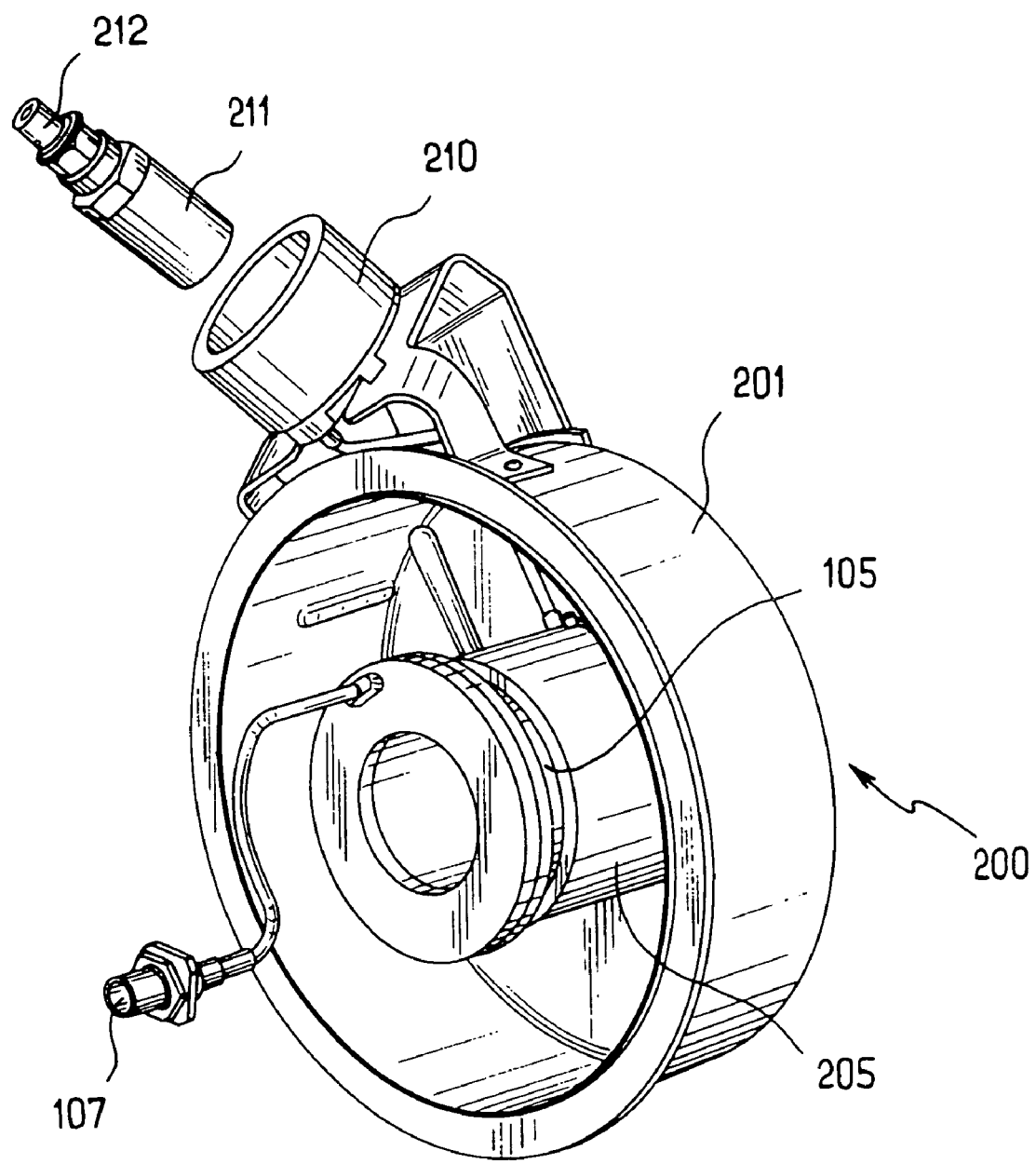
FIG. 2 is a perspective view of a portion of the equipment shown in FIG. 1, the sleeve and the tachometer being removed.

In a first embodiment shown in FIGS. 1 and 2, the equipment of the invention is associated with an axle end 1 carrying a wheel 2 of which one half-rim 3 can be seen (the other half-rim being silhouetted as a dashed line).

The equipment shown serves to measure continuously the speed of rotation of the wheel 2 and also the pressure that exists in the tire mounted on the wheel 2 (shown in dashed-line outline).

For this purpose, the equipment comprises a stationary portion 100 comprising a sleeve 101 inserted in the axle 1 and carrying a tachometer 102 having a shaft 103 that extends along the axis of rotation X of the wheel 2.

The equipment also comprises a rotary portion 200 comprising a cap 201 secured to the half-rim 3 by a clamping collar 202. The cap 201 carries internally a driver 203 adapted to co-operate with the shaft 103 of the tachometer 102 in order to drive said shaft in rotation when the wheel 2 is rotating. The tachometer 102 includes a first connector 104 having a first cable (not shown) connected thereto and passing along the inside of the axle.

According to the invention, the stationary portion 100 includes a cylindrical portion 105 that extends concentrically about the axis of rotation X of the wheel 2 and that carries a first antenna 106, in this case a winding of an electrical conductor. The first antenna 106 is connected to a second connector 107 carried by an extension of the sleeve 101 to which a second cable (not shown) is connected that passes along the inside of the cable.

The rotary portion has a cylindrical portion 205 that extends concentrically about the axis of rotation X of the wheel 2 and that carries a second antenna 207 also constituted by a winding of electrical conductor. This antenna extends facing the first antenna 106 of the stationary portion 100, such that the two antennas interact electromagnetically.

The second antenna 207 is connected by a cable 208 to a third antenna 109 carried by a projection 210 of the cap 201 and constituted by a winding of an electrical conductor.

Facing the third antenna 209 there extends a pressure sensor 211, which in this example is screwed on a self-closing valve 212, itself screwed to the half-rim 3 and enabling the pressure sensor 211 to be removed without deflating the tire. The valve 212 is placed at the end of an orifice that communicates with the inside of the tire through the half-rim 3.

The pressure sensor 211 has a fourth antenna 214 constituted by a winding of an electrical conductor that extends facing the third antenna 209 such that these two antennas interact electromagnetically. The pressure sensor 211 comprises a pressure-sensitive member associated with the fourth antenna 214 so as to cause at least one electromagnetic characteristic of the fourth antenna 214 to vary in response to a pressure level inside the tire.

The device of the invention operates as follows. When the wheel 2 is rotating, the driver 203 that rotates with the wheel 2 drives the shaft 103 of the tachometer so that it rotates, and thus causes a signal to be produced in response that is representative of the speed of rotation of the wheel 2.

In addition, regardless of whether the wheel 2 is rotating or stationary, the first and second antennas and also the third and fourth antennas continue to remain in electromagnetic interaction, while the second and third antennas are interconnected electrically. As a result, the electromagnetic characteristics of the first antenna 106, i.e. the antenna that is connected directly to the connector 107, are influenced by means of the pressure sensor via the electromagnetic connection thus established. It then suffices to apply a current to the first antenna 106 and to read the voltage that appears across the terminals of said antenna in order to obtain a signal that is representative of the pressure that exists inside the tire.

The device of the invention presents several advantages:

it is very easy to remove the wheel 2. It suffices to remove the clamping collar 202 so as to be able to remove the cap 201. Since the cap is not connected by any electrical wiring, whether to the connectors 104, 107 or to the pressure sensor 211, it is removed very easily without any risk of damaging a connection. In addition, the only mechanical connection between the stationary portion 100 and the rotary portion 200 is constituted by co-operation between the driver 203 and the shaft 103 of the tachometer 102. Removing the cap 201 disconnects the driver 203 from the shaft 103 and gives access to the nut that holds on the wheel 2. To put the cap 201 back into place, it suffices to ensure that the driver 203 co-operates properly with the shaft 103 of the tachometer 102, and that the third antenna 209 is generally in register with the pressure sensor 211;

the pressure sensor 211 can be changed independently of the remainder of the device of the invention. In addition, making use of a self-closing valve makes such a changeover much easier;

it is possible without any disassembly to test the pressure sensor 211 by means of an external unit 300 provided with an antenna 301 that is moved up to the antenna 214 of the pressure sensor 211, such that these two antennas interact electromagnetically. The external unit should include its own electrical power supply adapted to cause a current to flow in the antenna 301. The voltage across the terminals of said antenna depends on the pressure that exists inside the tire, thus enabling the operator to measure the pressure inside the tire and possibly decide on taking maintenance action (re-inflation, changing the wheel, or changing the sensor if the sensor is found to be faulty); and the electrical and mechanical systems of the tachometer and of the pressure sensor are completely segregated, such that the failure of one does not lead to the failure of the other.

Figure 3:
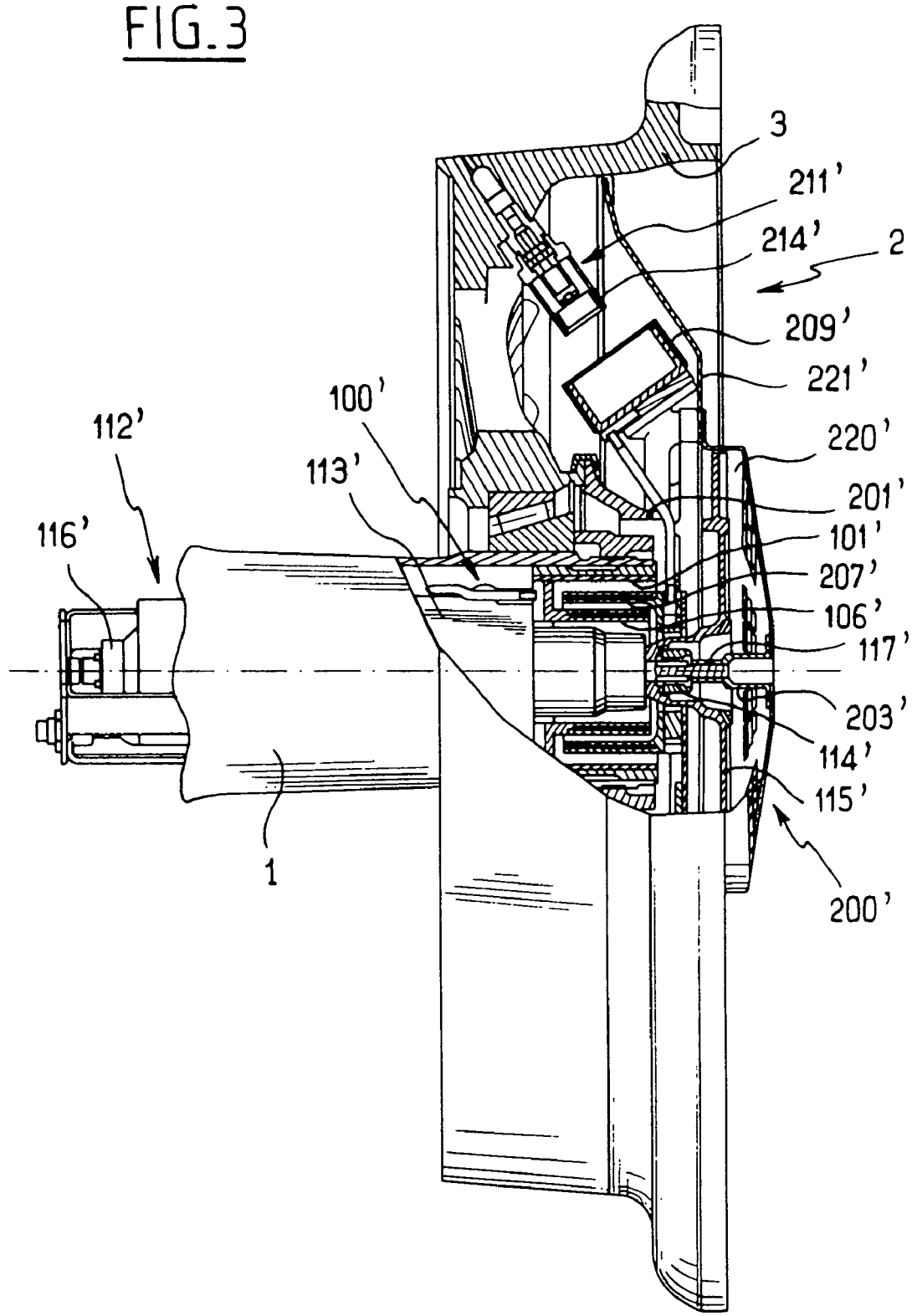
FIG. 3 is a section view of the end of an aircraft axle fitted with equipment constituting a second embodiment of the invention, integrating a fan for cooling the brake with which the wheel is fitted.

In a second embodiment of the invention, as shown in FIG. 3, the equipment of the invention may also incorporate a fan for cooling a brake with which the wheel 2 is fitted. References for elements that are common with the first embodiment have the same numbers as in FIGS. 1 and 2, together with prime symbols.

In the same manner as before, the sleeve 101' carries a first antenna 106'. The cap 102' carries a second antenna 207' facing the first antenna 106' so that the first and second antennas interact electro-magnetically. The cap 201' carries a third antenna 209' electrically connected to the second antenna 207'. A pressure sensor 211' is implanted on the half-rim 3 and includes a fourth antenna 214' that faces the third antenna 209' so that the third and fourth antennas interact electromagnetically.

This equipment differs from the above equipment by the tachometer 102 being replaced by a combined motor and tachometer unit 112'. The combined unit 112' comprises a motor 113' that is secured to the sleeve 101' and that has a hollow shaft 114 that can be seen projecting towards the end of the axle 1, and that receives at its end the impeller 115' of a cooling fan. The combined unit 112' also includes a tachometer 116' placed behind the motor 113' and having its shaft 117' extending inside the hollow shaft 114' of the motor 113' so as to project beyond the end thereof.

The rotary portion 200' of the equipment includes a cap 201' that receives a casing 220' for protecting the impeller 115', and also a mask 221' that covers the entire hollow portion of the half-rim 3.

In order to remove the wheel 2, the casing 220' and the mask 221' are removed initially so as to gain access to the impeller 115'. The nut that secures the impeller 115' to the hollow shaft 114' of the motor 113 is removed in order to enable the impeller 115' to be removed, and then the cap 201' is removed so as to give access to the nut that holds on the wheel 2.

In the same manner as before, none of the elements constituting the equipment of the invention that are disassembled in order to gain access to the wheel has any electrical connection with the pressure sensor or any other element, such that disassembling these elements leads to no risk of damaging a connection. In addition, the only mechanical connection between the stationary portion 100' and the rotary portion 200' is constituted by the co-operation between the driver 203' (in this case secured to the casing 220') and the shaft 117' of the tachometer 116'. This connection is easily disconnected merely by removing the casing 220'.

Figure 4:
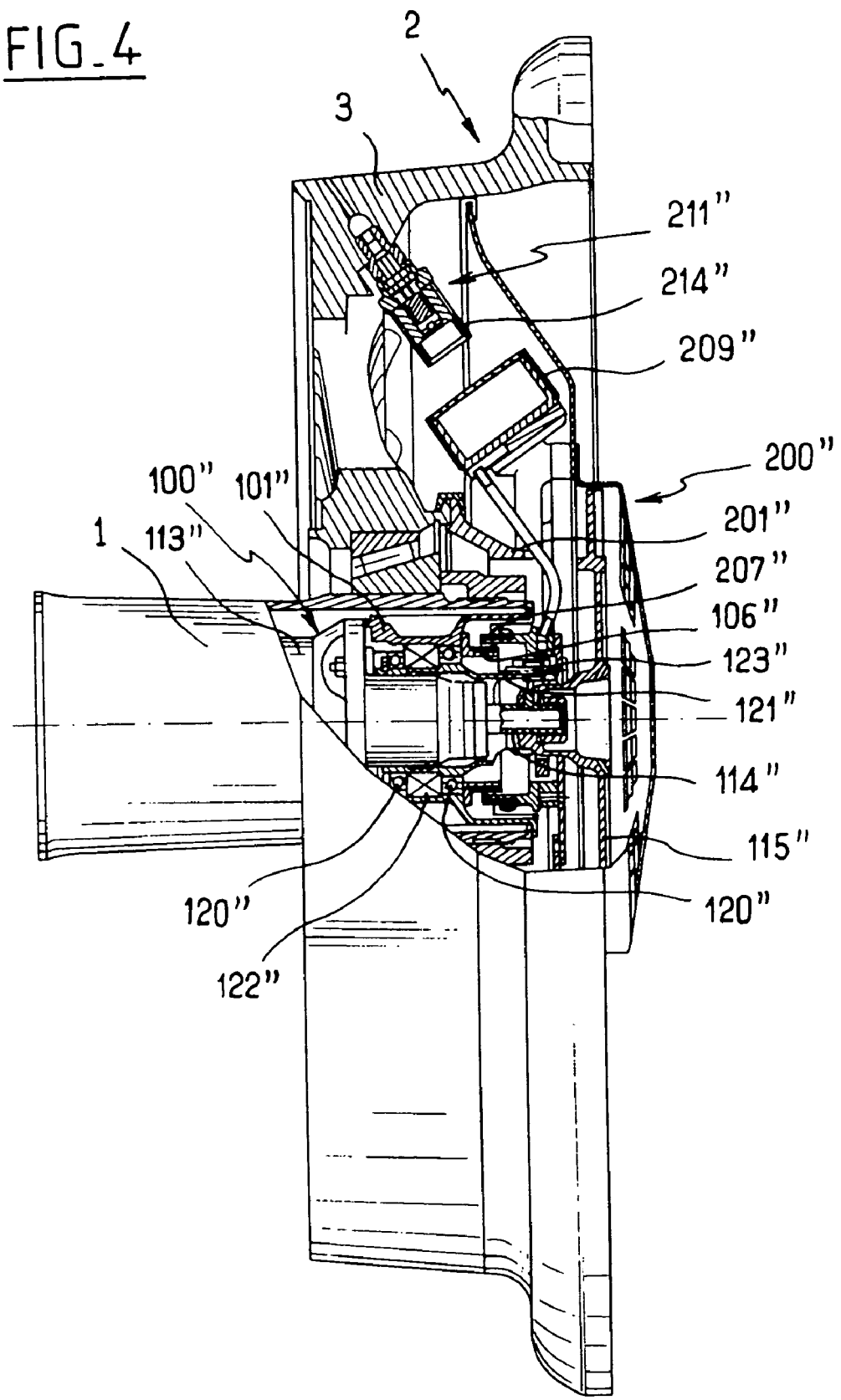
FIG. 4 is a section view of the end of an aircraft axle fitted with equipment constituting a third embodiment of the invention.
Figure 5:
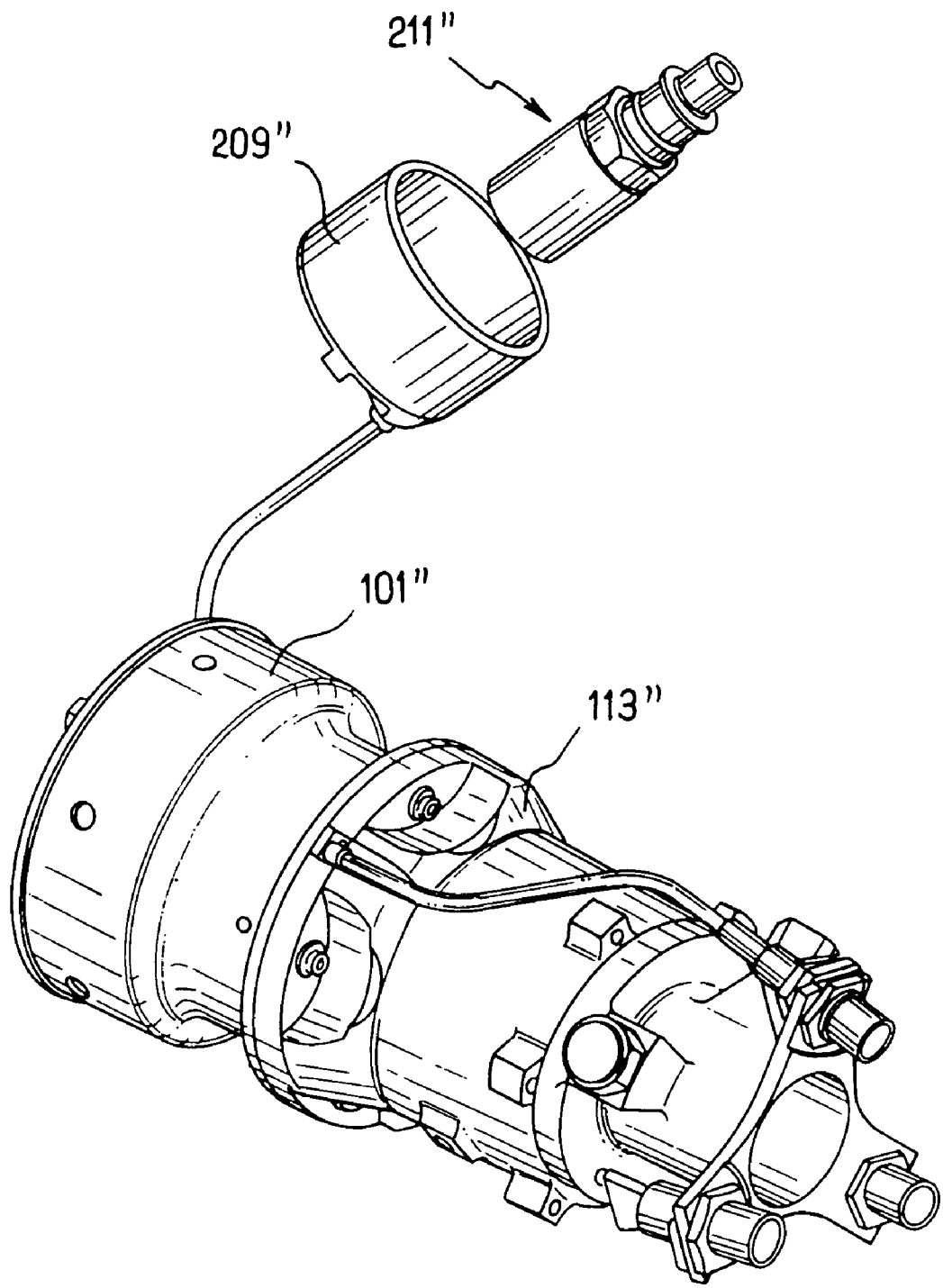
FIG. 5 is a perspective view of the equipment shown in FIG. 4.

In a third embodiment shown in FIGS. 4 and 5, use continues to be made of a combined motor and tachometer unit. Nevertheless, the tachometer is no longer placed behind the motor, but instead it is placed around it. In these figures, the references for elements that are common with similar elements in the second embodiment are given the same numbers as in FIG. 3, associated with double primes.

As can be seen in FIG. 4, the sleeve 101" has a rear face that carries the motor 113" of the combined unit 112". The motor has a shaft 114" that extends to receive an impeller 115" of the fan.

The sleeve 101" receives the tachometer directly, and for this purpose it includes bearings 120" that guide a pushing 121" in rotation. Between the sleeve 101" and the bushing 121" there extend means 122" for measuring speed of rotation (represented by a cross in the drawings), e.g. variable reluctance means. The bushing 121" extends around the end of the motor 113", and is free to rotate relative thereto.

The bushing 121" is constrained to rotate with the cap 201" of the rotary portion 200" by means of screws 123" (only one screw is visible in FIG. 4). Thus, the rotation of the wheel 2 is transmitted to the bushing 121" so that the measurement means 122" generate an electrical signal in response to rotation of the bushing 121".

In the same manner as above, the sleeve 101" carries a first antenna 106". The cap 201" carries a second antenna 207" in register with the first antenna 106" so that the first and second antennas interact electro-magnetically. The cap 201" carries a third antenna 209" electrically connected to the second antenna 207". A pressure sensor 211" is implanted in the half-rim 3 and includes a fourth antenna 214" that extends in register with the third antenna 209" so that the third and fourth antennas interact electromagnetically.

As above, none of the elements of the equipment of the invention that are disassembled in order to gain access to the wheel has any electrical connection with the pressure sensor or any other element, such that disassembling these elements does not lead to any risk of damaging a connection. In addition, the only mechanical connection between the stationary portion 100" and the rotary portion 200" is constituted by screws 123" between the bushing 121" and the cap 201". This drive is easily disassembled merely by unscrewing the screws 123" that become accessible once the impeller 115" has been removed.

Preferably, between the second and third antennas (207/ 209, 207'/209', 207"/209"), i.e. between the antennas that are secured to the rotary portion, electro-magnetic tuning is provided, e.g. by means of capacitors, so that the circuit comprising the second antenna and the third antenna is resonant at the frequency of the power supply current fed to the first antenna (106, 106', 106"). This increases the transmission quality of the pressure acquisition connection, thus making it possible to have a greater distance between the third antenna and the fourth antenna (the antenna secured to the pressure sensor), thus making it possible to reduce the risk of collision between the pressure sensor and the cap when the cap is being removed from the wheel.

Figure 6:
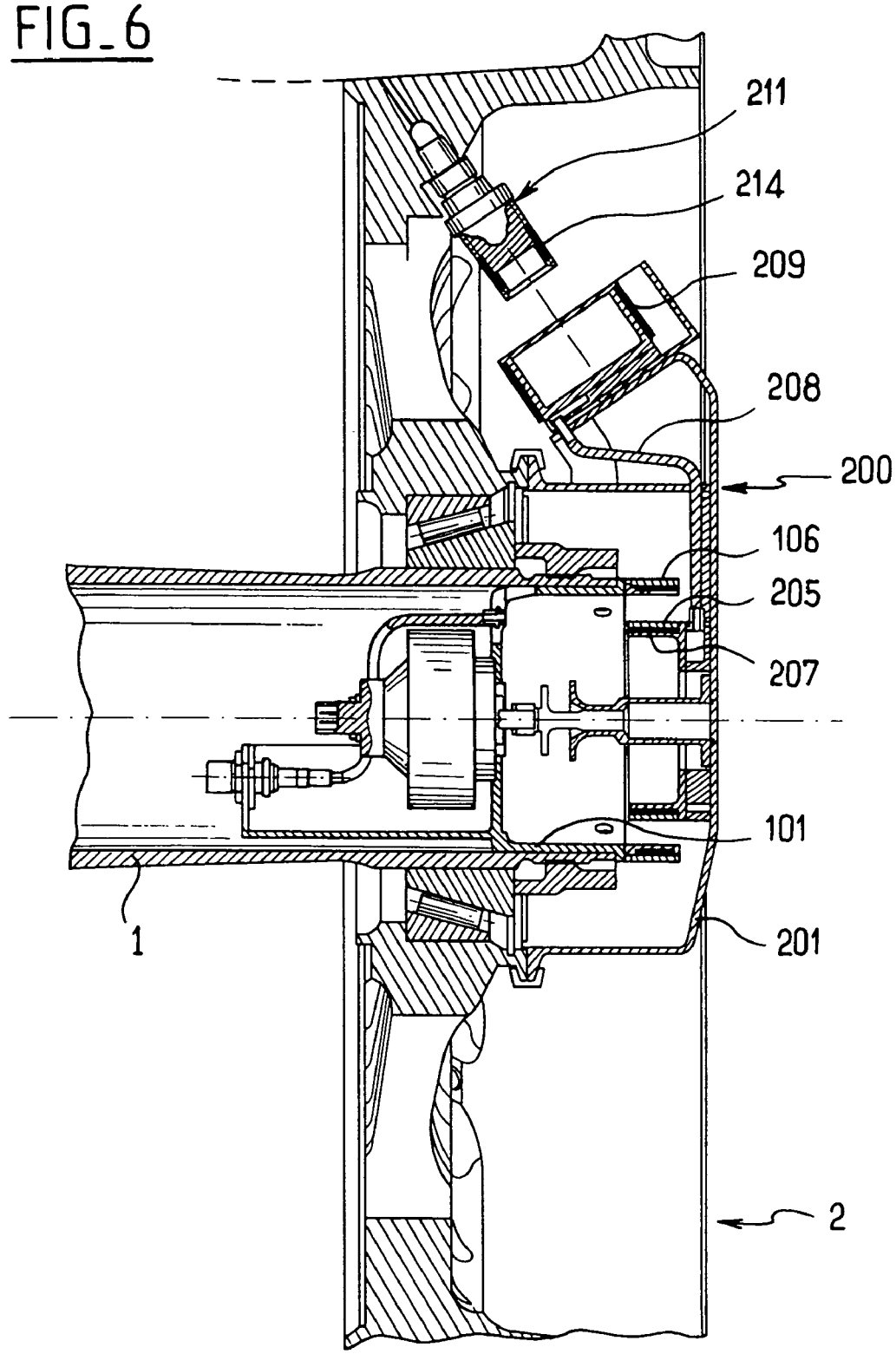
FIG. 6 is a section view analogous to that of FIG. 1 showing a variant of the first embodiment.

FIG. 6 shows a variant of the first embodiment in which the first antenna 106 is carried at the end of the sleeve 101 which extends outwards from the axle 1. Thus, the stationary portion of the equipment need not be contained completely within the axle, but may project therefrom, at least in part.

The second antenna 207 is still carried by the cylindrical portion 205 secured to the cap 201, but in this variant the cylindrical portion 205 extends inside the sleeve 101, such that the second antenna 207 extends inside the first antenna 106. It should be observed that the second antenna does not penetrate into the axle 101.

Figure 7:
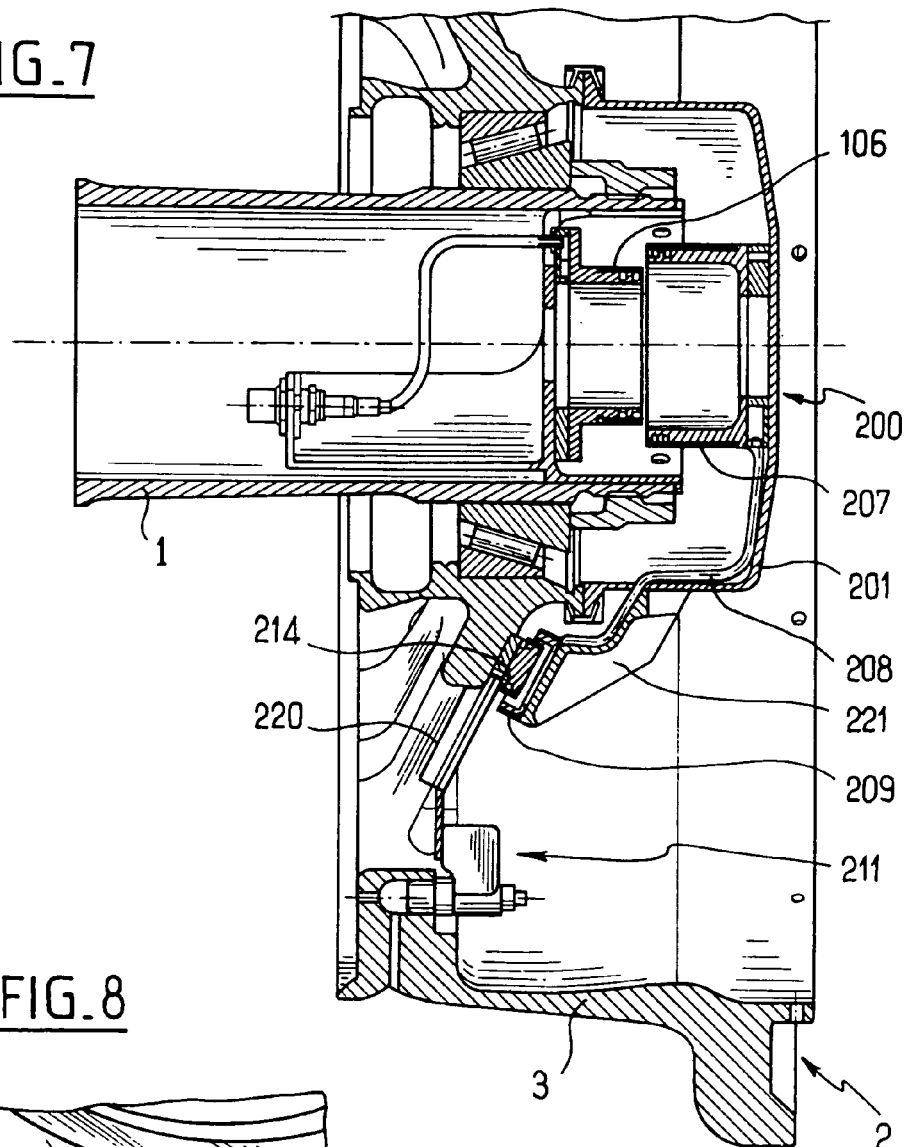
FIG. 7 is a section view of the end of an axle fitted with equipment constituting a fourth embodiment of the invention.
Figure 8:
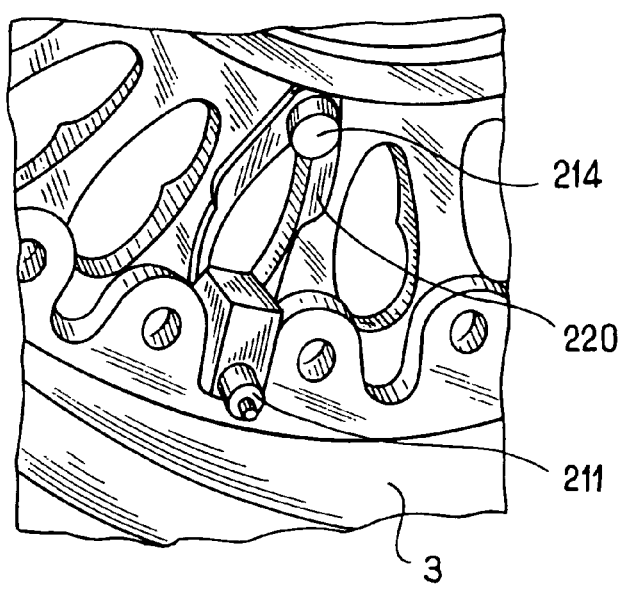
FIG. 8 is a fragmentary perspective view of the FIG. 7 wheel showing the pressure sensor.

In a fourth embodiment shown in FIGS. 7 and 8 and that does not include a tachometer, the fourth antenna 214 is no longer secured directly to the pressure sensor 211 but is offset so as to be closer to the cap 201 of the rotary portion 200.

For this purpose, the pressure sensor 211 is associated with a carrier member 220 having two branches that extend against the flanks of spokes of the half-rim 3 of the wheel 2, matching the shape of the gaps between the spokes. The ends of the branches meet in order to receive the fourth antenna 214 which is thus located close to the cap 201 of the rotary portion 200. The carrier member 220 is designed to be lightly forced between the spokes of the half-rim 3, so as to avoid any vibration of the fourth antenna 214.

The carrier member 220 houses connection wires between the pressure sensor 211 and the fourth antenna 214, so as to ensure that the wires are protected from impacts.

The third antenna 209 is carried by a projection 221 that extends from the cap 201 but that is much shorter than the projection 210 of the first embodiment shown in FIG. 1, such that the cap 210 is generally more compact and easier to handle.

The connection wires 208 connecting the third antenna 209 to the second antenna 207 is completely sheltered by the cap and by the projection 221.

It should be observed that the third antenna 209 is designed to overlap the fourth antenna 214, thus informing the person carrying out assembly about the angular position of the cap 201 relative to the pressure sensor 211. The third antenna 209 and the fourth antenna are thus much closer together, thereby improving the efficiency of transmission.

The invention is not limited to the description above, but on the contrary covers any variant coming within the ambit defined by the claims.

In particular, although the sensor implanted on the rim is described as being a pressure sensor, the invention naturally covers the use of other sensors, e.g. a temperature sensor.

Although the equipment shown herein has remote connection means each comprising a pair of antennas in electromagnetic interaction, it is possible to use any other remote connection means, for example infrared means.

Although it is stated that two remote connection means are used, such that the rotary portion has no physical electrical connection either with the sensor or with the rotary portion, the invention also covers equipment in which the only remote connection extends between the rotary portion and the sensor. Under such circumstances, it is necessary to provide an electrical connection of some other type between the rotary portion and the stationary portion, for example a connection by means of brushes.

What is claimed is:

1. Axle end equipment for an aircraft, the equipment comprising:
    a stationary portion for securing to the axle and a rotary portion for securing to the wheel carried by the axle,
    first remote connection means for putting a sensor mounted on the wheel into contactless electromagnetic relationship with the rotary portion of the equipment, and
    second remote connection means for putting the rotary portion into electromagnetic relationship with the stationary portion, the first and second remote connection means being electrically connected in the rotary portion so that the sensor is in electromagnetic relationship with the stationary portion via the remote connection means,
    wherein each of the first and second remote connection means comprises two antennas, each comprising a conductor winding and disposed facing each other so as to interact electro-magnetically, one of the antennas of the first remote connection means and one of the antennas of the second remote connection means being electrically interconnected in the rotary portion, and
    wherein the antenna of the first remote connection means and the antenna of the second remote connection means that are electrically interconnected in the rotary portion are integrated in an electrical circuit that is resonant at a frequency of a power supply current fed to the other antenna of the second remote connection means that is disposed on the stationary portion.

2. Equipment according to claim 1, in which the stationary portion carries a rotary member that is driven in rotation in operation by the rotary portion via quick disconnection drive means.

3. Equipment according to claim 1, in which the stationary portion carries a drive motor for driving an impeller of a fan for a brake associated with the wheel.

4. Equipment according to claim 1, in which the first remote connection means includes an antenna that is electrically connected to the sensor while being offset therefrom so as to be located close to the rotary portion.

5. A method of maintaining equipment for an aircraft, the equipment comprising:
    a stationary portion for securing to the axle and a rotary portion for securing to a wheel carried by the axle,
    first remote connection means for putting a sensor mounted on the wheel into contactless electromagnetic relationship with the rotary portion of the equipment, and
    second remote connection means for putting the rotary portion into electromagnetic relationship with the stationary portion, the first and second remote connection means being electrically connected in the rotary portion so that the sensor is in electromagnetic relationship with the stationary portion via the remote connection means,
    wherein each of the first and second remote connection means comprises two antennas, each comprising a conductor winding and disposed facing each other so as to interact electro-magnetically, one of the antennas of the first remote connection means and one of the antennas of the second remote connection means being electrically interconnected in the rotary portion, and wherein the antenna of the first remote connection means and the antenna of the second remote connection means that are electrically interconnected in the rotary portion are integrated in an electrical circuit that is resonant at a frequency of a power supply current fed to the other antenna of the second remote connection means that is disposed on the stationary portion, the method comprising:

bringing an external unit into remote electromagnetic relationship with the sensor when the sensor is installed on the rim of the wheel, and testing the sensor remotely by means of the external unit when brought into remote electromagnetic relationship with the sensor when the sensor is installed on the rim of the wheel.

\* \* \* \* \*